(12) United States Patent
Bailey et al.

(10) Patent No.: US 9,874,744 B2
(45) Date of Patent: Jan. 23, 2018

(54) SYSTEMS, DEVICES, AND METHODS FOR WEARABLE HEADS-UP DISPLAYS

(71) Applicant: THALMIC LABS INC., Kitchener (CA)

(72) Inventors: Matthew Bailey, Kitchener (CA); Stefan Alexander, Elmira (CA)

(73) Assignee: THALMIC LABS INC., Kitchener (CA)

( * ) Notice: Subject to any disclaimer, the term of this patent is extended or adjusted under 35 U.S.C. 154(b) by 0 days.

(21) Appl. No.: 14/749,359

(22) Filed: Jun. 24, 2015

(65) Prior Publication Data

US 2015/0378162 A1 Dec. 31, 2015

Related U.S. Application Data

(60) Provisional application No. 62/017,089, filed on Jun. 25, 2014, provisional application No. 62/053,598,
(Continued)

(51) Int. Cl.
*G02B 26/10* (2006.01)
*G02B 27/30* (2006.01)
*G02B 27/01* (2006.01)

(52) U.S. Cl.
CPC ........... *G02B 26/10* (2013.01); *G02B 27/017* (2013.01); *G02B 27/0176* (2013.01);
(Continued)

(58) Field of Classification Search
CPC .... G09G 26/10; G09G 27/017; G02B 27/017; G02B 27/0176; G02B 27/30
See application file for complete search history.

(56) References Cited

U.S. PATENT DOCUMENTS 3,408,133 A 10/1968 Lee
5,103,323 A 4/1992 Magarinos et al.
(Continued)

FOREIGN PATENT DOCUMENTS

JP 61-198892 A 9/1986
JP 2013-160905 A 8/2013
WO 2015/123775 A1 8/2015

OTHER PUBLICATIONS

International Search Report and Written Opinion dated Apr. 25, 2017 for corresponding International Application No. PCT/US2016/067246, 12 pages.
(Continued)

*Primary Examiner* — Kevin M Nguyen
(74) *Attorney, Agent, or Firm* — Seed IP Law Group LLP

(57) ABSTRACT

Systems, devices, and methods for transparent displays that are well-suited for use in wearable heads-up displays are described. Such transparent displays include one or more scanning projector(s) that is/are mounted on or proximate the lens portion(s) thereof, directly in the field of view of the user. Each scanning projector includes a respective light source that sequentially generates pixels or other discrete portions of an image and a respective dynamic optical beam-steerer that controllably steers the modulated light directly towards select regions of the eye of the user. Successive portions of the image are generated in rapid succession until the entire image is displayed to the user by projection directly onto the eye of the user from one or more point(s) within the user's field of view.

20 Claims, 11 Drawing Sheets

Related U.S. Application Data filed on Sep. 22, 2014, provisional application No. 62/117,316, filed on Feb. 17, 2015.

(52) U.S. Cl.
CPC ........ *G02B 27/30* (2013.01); *G02B 2027/015* (2013.01); *G02B 2027/0154* (2013.01); *G02B 2027/0178* (2013.01); *G02B 2027/0187* (2013.01)

(56) References Cited

U.S. PATENT DOCUMENTS

| | | | |
|---|---|---|---|
| 5,467,104 | A | 11/1995 | Furness, III et al. |
| 5,596,339 | A | 1/1997 | Furness, III et al. |
| 5,742,421 | A | 4/1998 | Wells et al. |
| 6,008,781 | A | 12/1999 | Furness, III et al. |
| 6,184,847 | B1 | 2/2001 | Fateh et al. |
| 6,236,476 | B1 | 5/2001 | Son et al. |
| 6,317,103 | B1 | 11/2001 | Furness, III et al. |
| 6,377,277 | B1 | 4/2002 | Yamamoto |
| 6,639,570 | B2 | 10/2003 | Furness, III et al. |
| 6,972,734 | B1 | 12/2005 | Ohshima et al. |
| 7,473,888 | B2 | 1/2009 | Wine et al. |
| 7,640,007 | B2 | 12/2009 | Chen et al. |
| 7,684,105 | B2 | 3/2010 | Lamontagne et al. |
| 7,850,306 | B2 | 12/2010 | Uusitalo et al. |
| 7,925,100 | B2 | 4/2011 | Howell et al. |
| 8,120,828 | B2 | 2/2012 | Schwerdtner |
| 8,179,604 | B1 | 5/2012 | Prada Gomez et al. |
| 8,188,937 | B1 | 5/2012 | Amafuji et al. |
| 8,355,671 | B2 | 1/2013 | Kramer et al. |
| 8,666,212 | B1 | 3/2014 | Amirparviz |
| 8,704,882 | B2 | 4/2014 | Turner |
| 8,922,481 | B1 | 12/2014 | Kauffmann et al. |
| 8,970,571 | B1 | 3/2015 | Wong et al. |
| 8,971,023 | B2 | 3/2015 | Olsson et al. |
| 9,086,687 | B2 | 7/2015 | Park et al. |
| 2001/0033402 | A1 | 10/2001 | Popovich |
| 2002/0003627 | A1 | 1/2002 | Rieder |
| 2002/0030636 | A1* | 3/2002 | Richards ............ G02B 27/017 345/8 |
| 2002/0120916 | A1 | 8/2002 | Snider, Jr. |
| 2005/0012715 | A1 | 1/2005 | Ford |
| 2007/0132785 | A1 | 6/2007 | Ebersole et al. |
| 2009/0207464 | A1 | 8/2009 | Wiltshire et al. |
| 2010/0149073 | A1 | 6/2010 | Chaum et al. |
| 2012/0002256 | A1 | 1/2012 | Lacoste et al. |
| 2012/0139817 | A1* | 6/2012 | Freeman ............ G02B 27/0101 345/8 |
| 2012/0188158 | A1 | 7/2012 | Tan et al. |
| 2012/0249797 | A1 | 10/2012 | Haddick et al. |
| 2013/0016292 | A1 | 1/2013 | Miao et al. |
| 2013/0016413 | A1* | 1/2013 | Saeedi ................ G02B 27/01 359/205.1 |
| 2013/0135722 | A1* | 5/2013 | Yokoyama ............ G02B 27/26 359/465 |
| 2013/0165813 | A1 | 6/2013 | Chang et al. |
| 2013/0198694 | A1 | 8/2013 | Rahman et al. |
| 2013/0215235 | A1* | 8/2013 | Russell ............. H04N 13/0203 348/47 |
| 2013/0222384 | A1 | 8/2013 | Futterer |
| 2013/0265437 | A1 | 10/2013 | Thörn et al. |
| 2013/0332196 | A1 | 12/2013 | Pinsker |
| 2013/0335302 | A1 | 12/2013 | Crane et al. |
| 2014/0045547 | A1 | 2/2014 | Singamsetty et al. |
| 2014/0198034 | A1 | 7/2014 | Bailey et al. |
| 2014/0198035 | A1 | 7/2014 | Bailey et al. |
| 2014/0202643 | A1 | 7/2014 | Hikmet et al. |
| 2014/0204455 | A1 | 7/2014 | Popovich et al. |
| 2014/0226193 | A1 | 8/2014 | Sun |
| 2014/0232651 | A1 | 8/2014 | Kress et al. |
| 2014/0285429 | A1 | 9/2014 | Simmons |
| 2014/0368896 | A1* | 12/2014 | Nakazono ............ G02B 26/105 359/198.1 |
| 2015/0036221 | A1* | 2/2015 | Stephenson ........ G02B 27/0101 359/630 |
| 2015/0205134 | A1 | 7/2015 | Bailey et al. |
| 2015/0325202 | A1 | 11/2015 | Lake et al. |
| 2015/0362734 | A1 | 12/2015 | Moser et al. |
| 2015/0378161 | A1 | 12/2015 | Bailey et al. |
| 2015/0378162 | A1 | 12/2015 | Bailey et al. |
| 2015/0378164 | A1 | 12/2015 | Bailey et al. |
| 2016/0033771 | A1 | 2/2016 | Tremblay et al. |
| 2016/0202081 | A1 | 7/2016 | Debieuvre et al. |
| 2016/0238845 | A1 | 8/2016 | Alexander et al. |
| 2016/0274365 | A1 | 9/2016 | Bailey et al. |
| 2016/0274758 | A1 | 9/2016 | Bailey |
| 2016/0327796 | A1 | 11/2016 | Bailey et al. |
| 2016/0349514 | A1 | 12/2016 | Alexander et al. |
| 2016/0349515 | A1 | 12/2016 | Alexander et al. |
| 2016/0349516 | A1 | 12/2016 | Alexander et al. |
| 2016/0377865 | A1 | 12/2016 | Alexander et al. |
| 2016/0377866 | A1 | 12/2016 | Alexander et al. |
| 2017/0068095 | A1 | 3/2017 | Holland et al. |
| 2017/0097753 | A1 | 4/2017 | Bailey et al. |
| 2017/0115483 | A1 | 4/2017 | Aleem et al. |

OTHER PUBLICATIONS

Amitai, "P-27: A Two-Dimensional Aperture Expander for Ultra-Compact, High-Performance Head-Worn Displays," *SID Symposium Digest of Technical Papers* 36(1):360-363, 2005.
Äyräs et al., "Exit pupil expander with a large field of view based on diffractive optics," *Journal of the SID* 17(8):659-664, 2009.
Chellappan et al., "Laser-based displays: a review," *Applied Optics* 49(25):F79-F98, 2010.
Cui et al., "Diffraction from angular multiplexing slanted volume hologram gratings," *Optik* 116:118-122,2005.
Curatu et al., "Dual Purpose Lens for an Eye-Tracked Projection Head-Mounted Display," International Optical Design Conference 2006, *SPIE-OSA* 6342:63420X-1-63420X-7, 2007.
Curatu et al., "Projection-based head-mounted display with eye-tracking capabilities," *Proc. of SPIE* 5875:58750J-1-58750J-9, 2005.
Essex, "Tutorial on Optomechanical Beam Steering Mechanisms," OPTI 521 Tutorial, College of Optical Sciences, University of Arizona, 8 pages, 2006.
Fernández et al., "Optimization of a thick polyvinyl alcohol-acrylamide photopolymer for data storage using a combination of angular and peristrophic holographic multiplexing," *Applied Optics* 45(29):7661-7666, 2009.
Hainich et al., "Chapter 10: Near-Eye Displays," *Displays: Fundamentals & Applications*, AK Peters/CRC Press, 2011, 65 pages.
Hornstein et al., "Maradin's Micro-Mirror—System Level Synchronization Notes," SID 2012 Digest, pp. 981-984.
International Search Report, dated Jun. 8, 2016, for PCT/US2016/018293, 17 pages.
International Search Report, dated Jun. 8, 2016, for PCT/US2016/018298, 14 pages.
International Search Report, dated Jun. 8, 2016, for PCT/US2016/018299, 12 pages.
Itoh et al., "Interaction-Free Calibration for Optical See-Through Head-Mounted Displays based on 3D Eye Localization," 2014 IEEE Symposium on 3D User Interfaces (3DUI), pp. 75-82, 2014.
Kessler, "Optics of Near to Eye Displays (NEDs)," Presentation—Oasis 2013, Tel Aviv, Feb. 19, 2013, 37 pages.
Kress et al., "A review of head-mounted displays (HMD) technologies and applications for consumer electronics," *Proc. of SPIE* 8720:87200A-1-87200A-13, 2013.
Kress et al., "Diffractive and Holographic Optics as Optical Combiners in Head Mounted Displays," Proceedings of the 2013 ACM Conference on Pervasive and Ubiquitous Computing Adjunct Publication, pp. 1479-1482, 2013.
Kress, "Optical architectures for see-through wearable displays," Presentation—Bay Area—SID Seminar, Apr. 30, 2014, 156 pages.
Levola, "7.1: *Invited Paper*: Novel Diffractive Optical Components for Near to Eye Displays," *SID Symposium Digest of Technical Papers* 37(1):64-67, 2006.

(56) References Cited

OTHER PUBLICATIONS

Liao et al., "The Evolution of Mems Displays," *IEEE Transactions on Industrial Electronics* 56(4):1057-1065, 2009.

Lippert, "Chapter 6: Display Devices: RSD™ (Retinal Scanning Display)," *The Avionics Handbook*, CRC Press, 2001, 8 pages.

Majaranta et al., "Chapter 3—Eye-Tracking and Eye-Based Human-Computer Interaction," in *Advances in Physiological Computing*, Springer-Verlag London, 2014, pp. 17-39.

Schowengerdt et al., "Stereoscopic retinal scanning laser display with integrated focus cues for ocular accommodation" *Proc. of SPIE-IS&T Electronic Imaging 5291*:366-376, 2004.

Silverman et al., "58.5L: *Late News Paper*: Engineering a Retinal Scanning Laser Display with Integrated Accommodative Depth Cues," SID 03 Digest, pp. 1538-1541, 2003.

Takatsuka et al., "Retinal projection display using diffractive optical element," Tenth International Conference on Intelligent Information Hiding and Multimedia Signal Processing, IEEE, 2014, pp. 403-406.

Urey et al., "Optical performance requirements for MEMS—scanner based microdisplays," Conf. on MOEMS and Miniaturized Systems, *SPIE 4178*:176-185, 2000.

Urey, "Diffractive exit-pupil expander for display applications," *Applied Optics* 40(32):5840-5851, 2001.

Viirre et al., "The Virtual Retinal Display: A New Technology for Virtual Reality and Augmented Vision in Medicine," *Proc. ofMedicine Meets Virtual Reality*, IOS Press and Ohmsha, 1998, pp. 252-257. (6 pages).

* cited by examiner

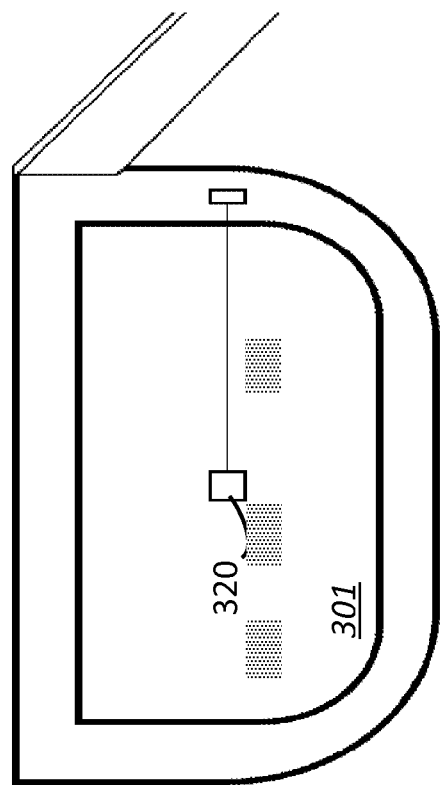
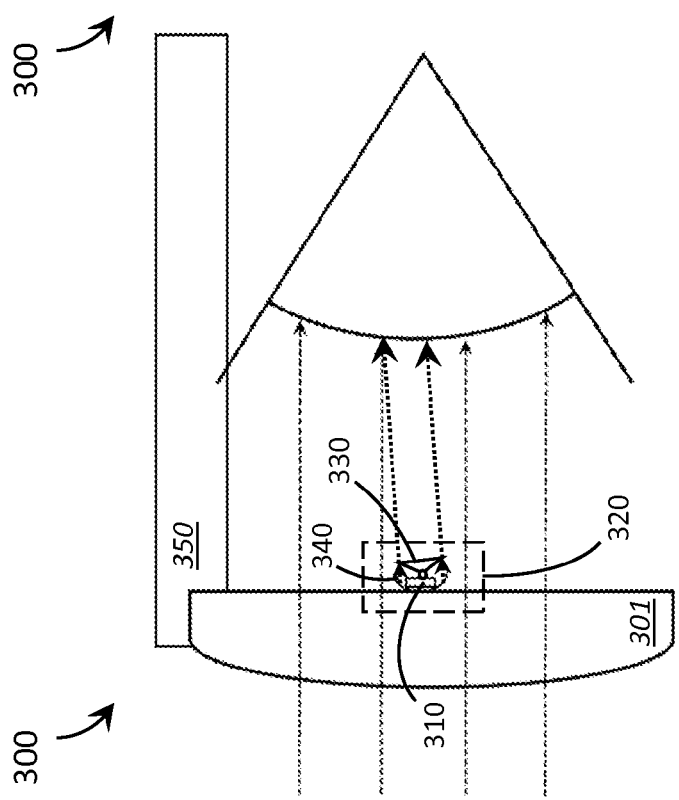
FIGURE 3H
FIGURE 3G

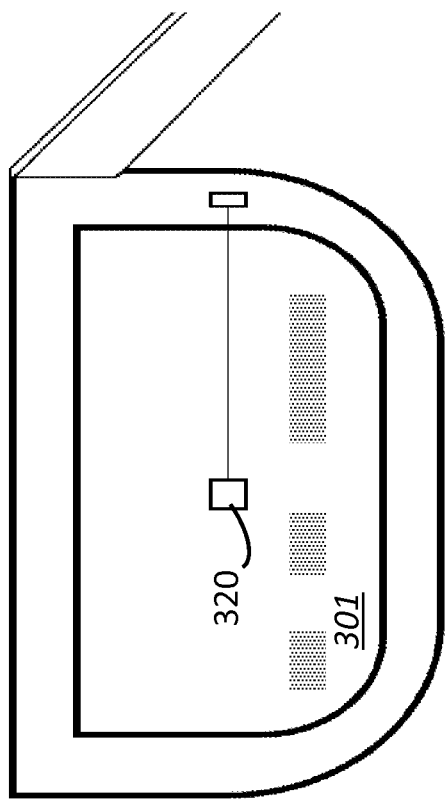
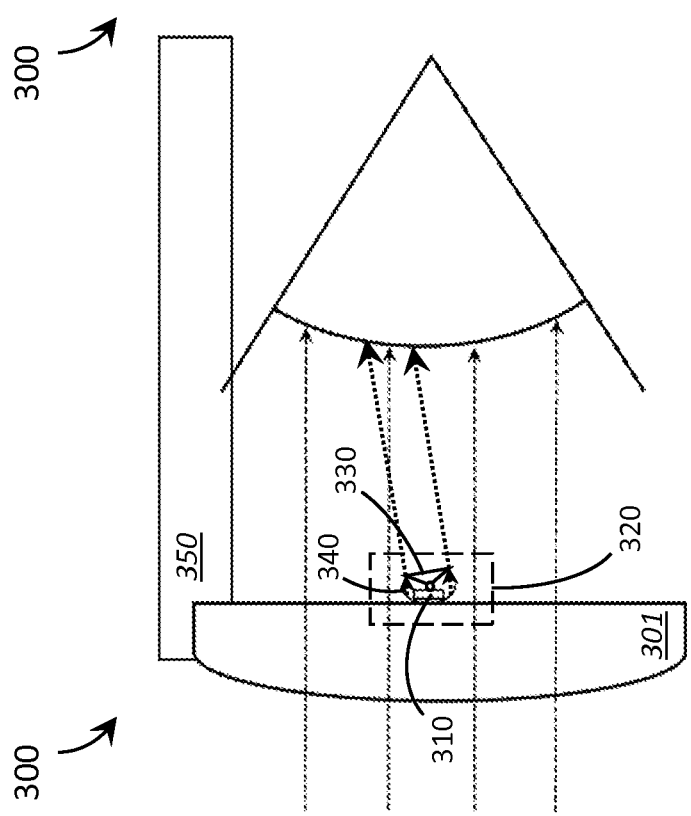
FIGURE 3J
FIGURE 3I

SYSTEMS, DEVICES, AND METHODS FOR WEARABLE HEADS-UP DISPLAYS

BACKGROUND

Technical Field

The present systems, devices, and methods generally relate to electronic display technologies and particularly relate to electronic display technologies that are well-suited for use in wearable heads-up displays.

Description of the Related Art

Wearable Electronic Devices

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be designed to operate without any wire-connections to other, non-portable electronic systems; however, a small and lightweight electronic device may still be considered portable even if it includes a wire-connection to a non-portable electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and ebook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

Wearable Heads-Up Displays

While wearable electronic devices may be carried and, at least to some extent, operated by a user without encumbering the user's hands, many wearable electronic devices include at least one electronic display. Typically, in order for the user to access (i.e., see) and interact with content presented on such electronic displays, the user must modify their posture to position the electronic display in their field of view (e.g., in the case of a wristwatch, the user may twist their arm and raise their wrist towards their head) and direct their attention away from their external environment towards the electronic display (e.g., look down at the wrist bearing the wristwatch). Thus, even though the wearable nature of a wearable electronic device allows the user to carry and, to at least some extent, operate the device without occupying their hands, accessing and/or interacting with content presented on an electronic display of a wearable electronic device may occupy the user's visual attention and limit their ability to perform other tasks at the same time.

The limitation of wearable electronic devices having electronic displays described above may be overcome by wearable heads-up displays. A wearable heads-up display is a head-mounted display that enables the user to see displayed content but does not prevent the user from being able to see their external environment. A wearable heads-up display is an electronic device that is worn on a user's head and, when so worn, secures at least one electronic display within the accessible field of view of at least one of the user's eyes, regardless of the position or orientation of the user's head, but this at least one display is either transparent or at a periphery of the user's field of view so that the user is still able to see their external environment. Examples of wearable heads-up displays include: the Google Glass®, the Optinvent Ora®, the Epson Moverio®, the Sony Glasstron®, just to name a few.

A challenge in the design of most wearable heads-up display devices is the need to provide focused, high-quality images to the user without limiting the user's ability to see their external environment, and while at the same time minimizing the bulk of the wearable heads-up display unit itself. All of the wearable heads-up display devices available today are noticeably bulkier than a typical pair of corrective eyeglasses or sunglasses and there remains a need in the art for electronic display technology that enables wearable heads-up display devices of more aesthetically-appealing design while simultaneously providing high-quality images to the user without limiting the user's ability to see their external environment.

BRIEF SUMMARY

A wearable heads-up display may be summarized as including: a support structure that in use is worn on a head of a user; a first transparent element that is physically coupled to the support structure, wherein the first transparent element is substantially planar and positioned within a field of view of at least one eye of the user when the support structure is worn on the head of the user; and a first scanning display element positioned on or proximate a surface of the first transparent element in the field of view of the at least one eye of the user, the first scanning display element comprising: a light-emitting element; a collimator to, in use, collimate light provided by the light-emitting element; and a controllable light-redirecting element to, in use, controllably redirect light provided by the light-emitting element to specific locations of the at least one eye of the user.

A wearable heads-up display may be summarized as including: a support structure that in use is worn on a head of a user; a transparent element that is physically coupled to the support structure and positioned within a field of view of at least one eye of the user when the support structure is worn on the head of the user; and a scanning display element positioned on or proximate a surface of the transparent element in the field of view of the at least one eye of the user, the scanning display element comprising: a light source; a collimator to collimate light signals provided by the light source; and a controllable beam-steerer to, in use, controllably redirect light provided by the light source to specific regions of the at least one eye of the user.

A wearable heads-up display may be summarized as including: a support structure that in use is worn on a head of a user; a transparent element that is physically coupled to the support structure, wherein the transparent element is positioned within a field of view of an eye of the user when the support structure is worn on the head of the user; and a scanning projector positioned on or proximate a surface of the transparent element in the field of view of the eye of the user, the scanning projector comprising: a light source; and a dynamic optical beam-steerer positioned to receive light signals provided by the light source and controllably redirect the light signals towards select regions of the eye of the user.

The wearable heads-up display may further include a collimator to collimate light signals provided by the light source. The collimator may include a parabolic reflector positioned in between the light source and the dynamic optical beam-steerer with respect to a path of light signals provided by the light source. The light source may be oriented to direct light signals away from the eye of the user and the parabolic reflector may be oriented to reflect the light signals from the light source towards the eye of the user.

The light source may include at least one light source selected from the group consisting of: a light-emitting diode and a laser. The dynamic optical beam-steerer may be controllably rotatable about at least two axes. The dynamic optical beam-steerer may be transmissive of the light signals provided by the light source. The dynamic optical beam-steerer may controllably redirect the light signals towards select regions of the eye of the user by at least one of reflection, refraction, and/or diffraction.

The transparent element may include a prescription eyeglass lens. The transparent element may be positioned within a field of view of a first eye of the user when the support structure is worn on the head of the user, and the wearable heads-up display may further include: a second transparent element that is physically coupled to the support structure, wherein the second transparent element is positioned within a field of view of a second eye of the user when the support structure is worn on the head of the user; and a second scanning projector positioned on or proximate a surface of the second transparent element in the field of view of the second eye of the user, the second scanning projector comprising: a second light source; and a second dynamic optical beam-steerer positioned to receive light signals provided by the second light source and controllably redirect the light signals towards select regions of the second eye of the user.

The support structure may have a general shape and appearance of an eyeglasses frame.

The wearable heads-up display may further include a processor physically coupled to the support structure and communicatively coupled to the scanning projector; and a non-transitory processor-readable storage medium physically coupled to the support structure and communicatively coupled to the processor, wherein the non-transitory processor-readable storage medium stores processor-executable instructions that, when executed by the processor, cause the processor to: control the light signals provided by the light source of the scanning projector; and control the dynamic optical beam-steerer of the scanning projector to redirect the light signals provided by the light source towards select regions of the eye of the user.

The scanning projector may include a first scanning projector, and the wearable heads-up display may further include: a second scanning projector positioned on or proximate the transparent element in the field of view of the eye of the user when the support structure is worn on the head of the user, the second scanning projector physically spaced apart from the first scanning projector, wherein the second scanning projector comprises: a second light source; and a second dynamic optical beam-steerer positioned to receive light signals provided by the second light source and controllably redirect the light signals towards select regions of the eye of the user. The wearable heads-up display may further include: at least one additional scanning projector positioned on or proximate the transparent element in the field of view of the eye of the user when the support structure is worn on the head of the user, the at least one additional scanning projector physically spaced apart from the first scanning projector and the second scanning projector, wherein the at least one additional scanning projector comprises: at least one additional light source; and at least one additional dynamic optical beam-steerer positioned to receive light signals provided by the at least one additional light source and controllably redirect the light signals towards select regions of the eye of the user. The wearable heads-up display may further include an eye-tracker carried by the support structure, wherein both the first scanning projector and the second scanning projector are selectively activatable/deactivatable based, at least in part, on a position of the eye of the user as determined by the eye-tracker.

The various embodiments described herein include a method of operating a wearable heads-up display when the wearable heads-up display is worn on a head of a user, the wearable heads-up display including a transparent element positioned in a field of view of an eye of the user and a scanning projector positioned in the field of view of the eye of the user on or proximate the transparent element, the scanning projector comprising a light source and a dynamic optical beam-steerer. The method may be summarized as including: configuring the dynamic optical beam-steerer of the scanning projector in a first configuration within the field of view of the eye of the user; generating a first light signal representative of at least a first portion of an image by the light source of the scanning projector within the field of view of the eye of the user; and redirecting the first light signal towards a first region of the eye of the user by the dynamic optical beam-steerer of the scanning projector within the field of view of the eye of the user.

The method may further include: configuring the dynamic optical beam-steerer of the scanning projector in a second configuration within the field of view of the eye of the user; generating a second light signal representative of at least a second portion of the image by the light source of the scanning projector within the field of view of the eye of the user; and redirecting the second light signal towards a second region of the eye of the user by the dynamic optical beam-steerer of the scanning projector within the field of view of the eye of the user. The image may include N portions, where N is an integer greater than 2, and the method may further include: until i=(N+1), where i is an integer with an initial value of 3, sequentially: configuring the dynamic optical beam-steerer of the scanning projector in an $i^{th}$ configuration within the field of view of the eye of the user; generating an $i^{th}$ light signal representative of at least an $i^{th}$ portion of the image by the light source of the scanning projector within the field of view of the eye of the user; and redirecting the $i^{th}$ light signal towards an $i^{th}$ region of the eye of the user by the dynamic optical beam-steerer of the scanning projector within the field of view of the eye of the user; and incrementing i by 1.

The wearable heads-up display may include a processor communicatively coupled to the light source and to the dynamic optical beam-steerer, and a non-transitory processor-readable storage medium communicatively coupled to the processor, the non-transitory processor-readable storage medium storing processor-executable instructions, and the method may further include executing the processor-executable instructions by the processor to: cause the processor to instruct the light source of the scanning projector to generate the first light signal representative of at least a first portion of the image within the field of view of the eye of the user; and cause the processor to instruct the dynamic optical beam-steerer to adopt the first configuration within the field of view of the eye of the user.

The wearable heads-up display may further include a second scanning projector positioned on or proximate the transparent element and within the field of view of the eye of the user, the second scanning projector physically spaced apart from the first scanning projector and the second scanning projector comprising a second light source and a second dynamic optical beam-steerer, the method may further include: configuring the second dynamic optical beam-steerer of the second scanning projector in a first configuration within the field of view of the eye of the user; generating a light signal representative of at least a portion of an image by the second light source of the second scanning projector within the field of view of the eye of the user; and redirecting the light signal towards a region of the eye of the user by the second dynamic optical beam-steerer of the second scanning projector within the field of view of the eye of the user. The wearable heads-up display may include an eye-tracker, and the method may further include: determining a position of the eye of the user by the eye-tracker; and selectively activating/deactivating the first scanning projector and/or the second scanning projector based, at least in part, on the position of the eye of the user determined by the eye-tracker.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 3G is an illustrative diagram showing a side view of a wearable heads-up display in a fourth stage of the exemplary use in accordance with the present systems, devices, and methods.

FIG. 3H is an illustrative diagram showing a front view of a wearable heads-up display in the fourth stage of the exemplary use in accordance with the present systems, devices, and methods.

FIG. 3I is an illustrative diagram showing a side view of a wearable heads-up display in a fifth stage of the exemplary use in accordance with the present systems, devices, and methods.

FIG. 3J is an illustrative diagram showing a front view of a wearable heads-up display in the fifth stage of the exemplary use in accordance with the present systems, devices, and methods.

DETAILED DESCRIPTION

Figure 1:
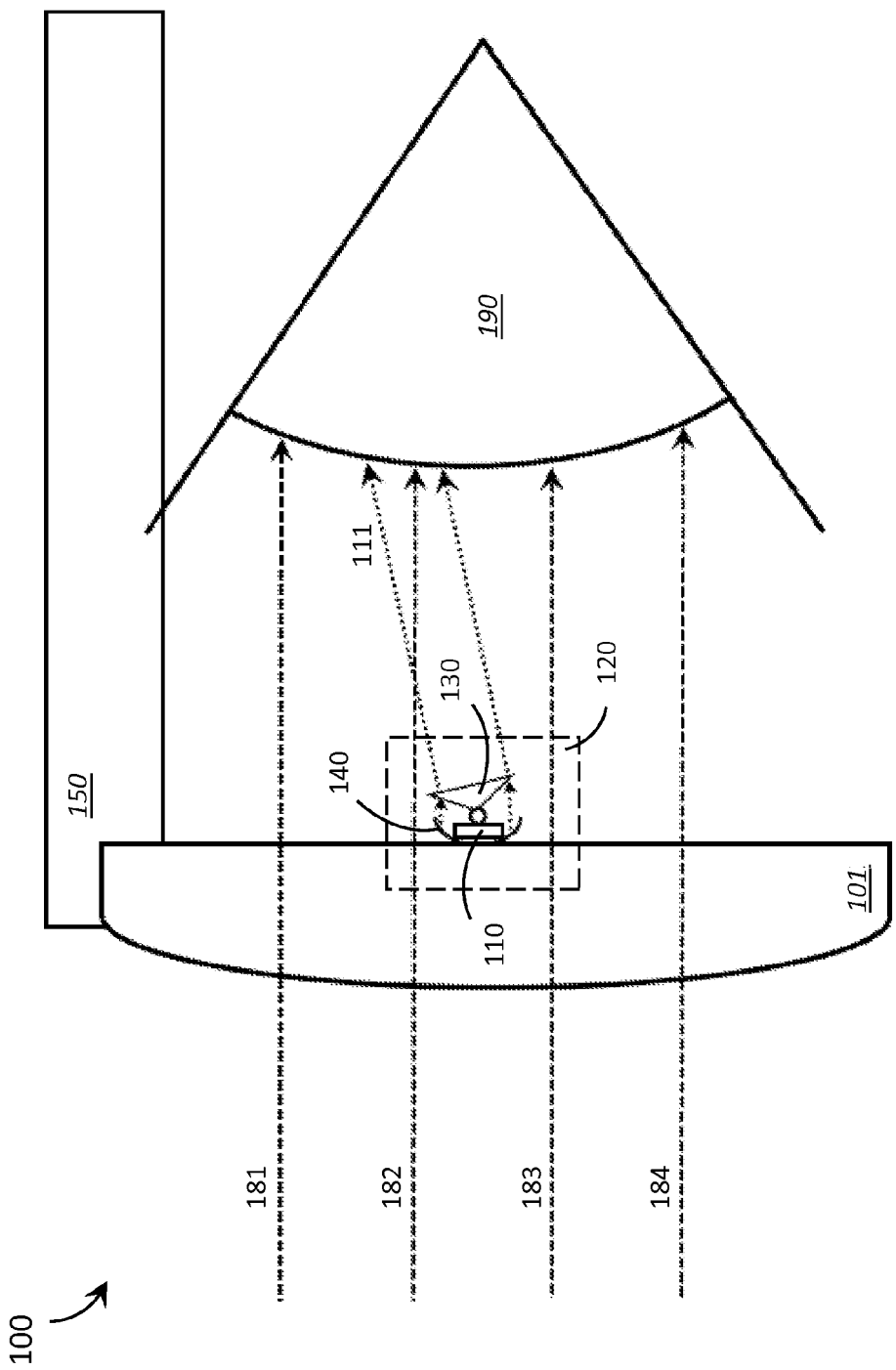
FIG. 1 is an illustrative diagram showing a side view of a wearable heads-up display in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for wearable heads-up displays that are at least partially transparent. The wearable heads-up displays described herein are significantly less bulky and less massive than other wearable heads-up displays available today.

Various wearable heads-up displays described herein each employ at least one "scanning projector" positioned within the field of view of an eye of the user and oriented to scan an image directly onto the user's eye in a similar way to that by which a conventional projector projects an image onto a display screen. The various embodiments of scanning projectors described herein each comprise at least one light-emitting element (e.g., a "light source," "laser", "light emitting diode(s)") that produces and/or provides (e.g., generates and/or emits) an image in portions (e.g., "light signals") at a time (e.g., on a pixel-by-pixel basis, a row-by-row basis, or a column-by-column basis) and a dynamic optical beam-steerer that directs the light signal portions of the image towards corresponding regions of the user's eye. As will be discussed in more detail later on, the dynamic optical beam-steerer may employ any of a variety of components and/or techniques, including without limitation, one or more of: a "reflector," a "refractor," a "diffractor," a "mirror," a "half silvered mirror," a "dichroic filter," a "prism," an "optic," and the like, and/or one or more element(s) that use any or all of reflection, refraction, and diffraction, either individually or in combination. The scanning projector generates and scans light directly over the user's eye to produce an image seen by the user. In the present systems, devices, and methods, the scanning projector is placed directly in the user's field of view, either on or at least proximate a transparent element of the wearable heads-up display such that the user may simultaneously see light from the external environment and light projected by the scanning projector of the wearable heads-up display.

Throughout this specification and the appended claims, reference is often made to a "transparent element" of a wearable heads-up display. As described in more detail later on, the wearable heads-up displays of the present systems, devices, and methods may be sized and dimensioned similar to (or otherwise have the general shape and appearance of) a pair of eyeglasses or sunglasses. In some embodiments, elements of the wearable heads-up display devices described herein may even be added to an existing pair of eyeglasses or sunglasses in order to convert the existing pair of eyeglasses or sunglasses into a wearable heads-up display as described herein. Accordingly, a "transparent element" of the wearable heads-up displays described herein may resemble or literally be a lens from a pair of eyeglasses or sunglasses, including but not limited to a prescription lens. Throughout the remainder of this description, the term "lens" is generally used to refer to such a "transparent element," though a person of skill in the art will appreciate that the transparent element(s) of the present systems, devices, and methods may take other "non-lens" forms in some implementations. For example, in some implementations a transparent element may be better characterized as a window having no substantial optical power or "lensing" effect on light transmitted therethrough. Furthermore, the term "transparent" should be interpreted generally as "substantially transparent" and does not limit the present systems, devices, and methods to lenses and transparent elements having 100% transparency.

Throughout this specification and the appended claims, the term "dynamic" is often used to describe one or more optical beam-steerer(s). Unless the specific context requires otherwise, the term "dynamic optical beam-steerer" is used to describe a system or device that is controllably variable (either rigidly of flexibly, e.g., by deformation) in at least one parameter (e.g., its shape, its position, its rotation, its orientation, its index of refraction, its optical power, and/or another optical property or other optical properties) with respect to light signals that are incident thereon, where a direction or path of such incident light is controllably affected (e.g., redirected) by such controllably variable property. As examples, a dynamic optical beam-steerer may include any or all of: a medium having a controllable refractive index, a variable lens, a tunable diffraction grating, a mechanical mirror-based gimbal or beam-director, one or more rotatable mirrors or micromirrors (e.g., MEMS-based or galvanometer-based), multiple prisms (e.g., Risley prisms), phased-array optics, and/or the like.

A person of skill in the art will appreciate that, in general, one or more reflective element(s) may be replaced by one or more refractive element(s) and/or one or more diffractive element(s), and vice versa, with some re-alignment of the optical path sometimes necessary, to achieve the same final end trajectory of a light signal.

FIG. 1 is an illustrative diagram showing a side view of a wearable heads-up display 100 in accordance with the present systems, devices, and methods. Display 100 includes a lens (e.g., a "transparent element," "partially transparent element," "focusing lens") 101 physically coupled to a support structure 150. In use, support structure 150 is worn on a head of a user so that lens 101 is positioned in front of and within a field of view of at least one eye 190 of the user. The combination of support structure 150 and lens 101 may resemble, or may literally be, a pair of eyeglasses or sunglasses. In the illustration of FIG. 1, an arm of support structure 150 is depicted, the arm 150 extending alongside of the user's head towards and, optionally, over an ear of the user. Lens 101 carries a scanning projector (e.g., a "scanning display element") 120 positioned directly in the field of view of eye 190. Wearable heads-up display 100 operates in accordance with the principle that the human eye can position a light source in the field of view based on the angle at which light from the source enters the eye as opposed to strictly based on the position of the light source in the eye's field of view. For example, scanning projector 120 may be mounted directly on an inner surface of lens 101. Scanning projector 120 is a single package that integrates a controllable (e.g., modulatable) light source 110, a collimator 140, and a dynamic optical beam-steerer 130 all in a single device 120, though in alternative embodiments any one or combination of components in scanning projector 120 may be engineered and/or implemented as one or more distinct component(s).

Light source 110 generates and/or emits (e.g., "provides") one or more light signal(s) 111 that represent(s) an image, or respective portions thereof. Light signals 111 are collimated by collimator 140 and redirected (e.g., steered) towards select regions of the user's eye 190 by beam-steerer 130. In the illustrated example, light source 110 and collimator 140 are both realized using a single microLED element (such as a microLED element available from InifiniLED Limited) in which an LED 110 is combined with a parabolic reflector 140 to produce collimated light 111. In accordance with the present systems, articles, and methods, the microLED is combined with a dynamic optical beam-steerer 130 which may comprise and/or implement any of the aforementioned beam-steering devices/techniques.

Parabolic reflector 140 is positioned in between light source 110 and dynamic optical beam-steerer 130 with respect to a path of light signals 111 provided by light source 110. Light source 110 is oriented to direct light signals 111 away from the eye 190 of the user and parabolic reflector 140 is oriented to reflect light signals 111 from light source 110 back towards the eye 190 of the user. In the illustrated embodiment, beam-steerer 130 is transmissive of light signals 111 provided by light source 110 and controllably rotatable about two orthogonal axes. Thus, beam-steerer 130 receives and relays collimated light (collimated beforehand by parabolic reflector 140); however, in some implementations one or more collimator(s) may be added downstream from beam-steerer 130 to collimate the light that is output thereby, or beam-steerer 130 may itself be adapted to receive non-collimated light and output collimated light.

Dynamic optical beam-steerer 130, within the field of view of eye 190, controls the angle at which light 111 output (also within the field of view of eye 190 though initially directed away from eye 190 in the illustrated embodiment) by light source 110 impinges on the eye 190. As described previously, the human eye can position a light source in the field of view based on the angle at which light from the source enters the eye; thus, the configuration of beam-steerer 130 determines the position of light signals 111 in the field of view of eye 190. In synchronization with a steering or "scan" pattern swept or otherwise effected by beam-steerer 130, light source 110 may modulate the intensity and/or color (if, for example, an RGB LED or RGB laser system is used) of light signals 111 (e.g., each light signal corresponding to a respective portion of an image).

Figure 2:
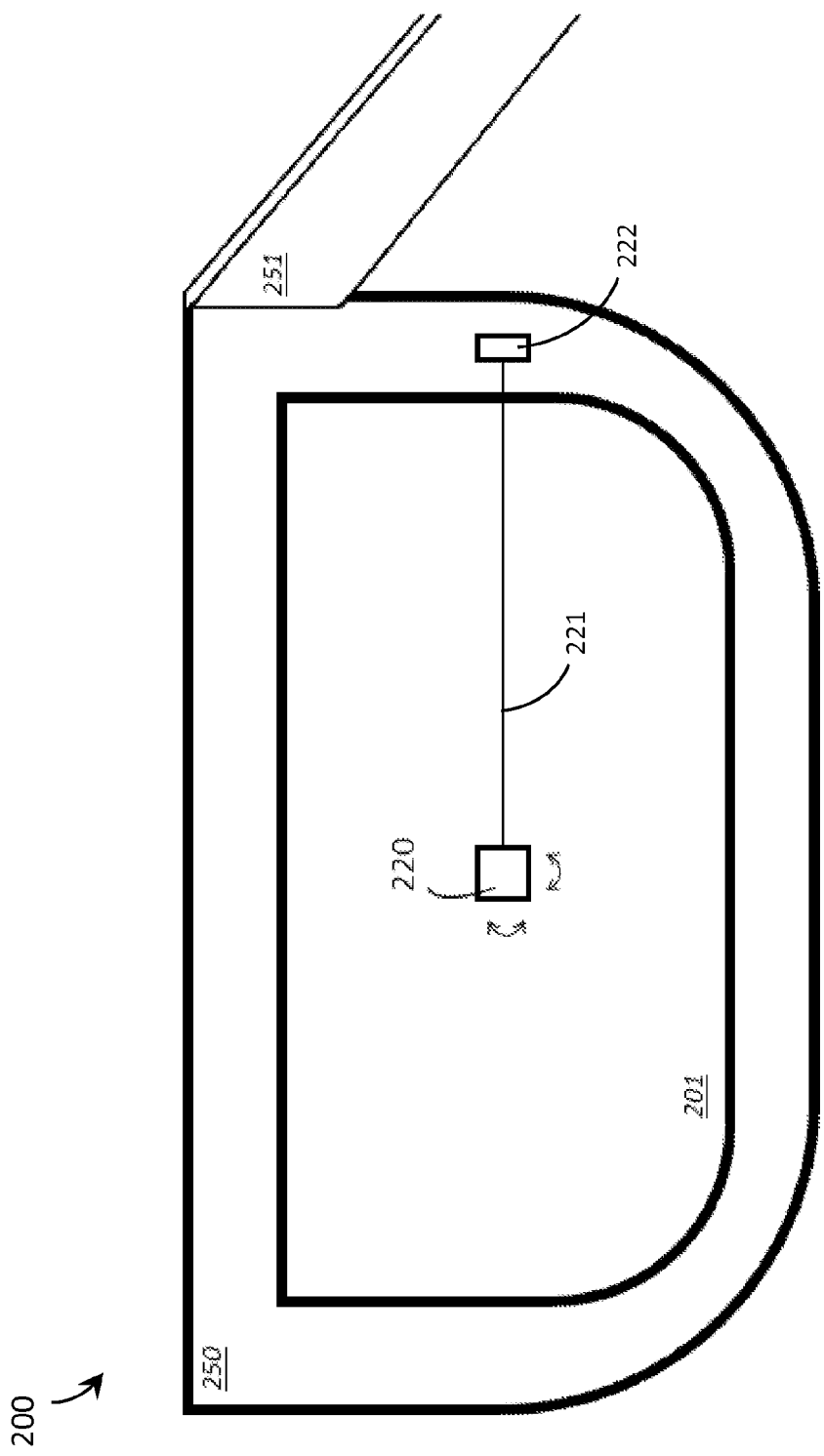
FIG. 2 is an illustrative diagram showing a front view of a wearable heads-up display in accordance with the present systems, devices, and methods.

Light source 110 may sequentially generate portions or aspects (e.g., pixels, rows, columns, etc.) of an image and these portions or aspects may be scanned over the eye 190 of the user by dynamic optical beam-steerer 130 to produce the collective image. Light from the user's external environment is depicted by rays 181, 182, 183, and 184, which pass through lens 101 and into the user's eye 190 substantially unaffected. Scanning project 120 may block or occlude a small amount of light from the user's external environment from reaching eye 190, but scanning projector 190 is positioned in such close proximity to eye 190 that eye 190 cannot focus thereupon, and scanning projector 120 is advantageously small enough (e.g., smaller than the pupil of the eye into which the scanning projector projects) that any such occlusion is negligible. Scanning projector 120 may be communicatively coupled to a power source and/or a control system (not illustrated in FIG. 1 but generally carried somewhere on or by support structure 150) by one or more communication pathways, such as one or more substantially transparent electrically conductive traces. FIG. 2 is an illustrative diagram showing a front view (from the user's perspective) of a wearable heads-up display 200 in accordance with the present systems, devices, and methods. Display 200 is substantially similar to display 100 from FIG. 1. Display 200 includes a lens 201 carried by a support structure 250. Support structure 250 includes a support arm 251 that that extends towards and, optionally, over an ear of the user when wearable heads-up display 200 is worn on a head of the user. On or proximate lens 201 and positioned directly within a field of view of an eye of the user, wearable heads-up display 200 includes a scanning projector 220. Scanning projector 220 includes a light source (e.g., one or more LED(s) or laser(s)) and a dynamic optical beam-steerer that, in the illustrated embodiment, is operative to steer light signals provided by the light source in two orthogonal directions. Scanning projector 220 may also include a collimator as described for scanning projector 120 in FIG. 1. Dynamic optical beam-steerer 220 may include one or more ("MEMS") based device(s) and may be sufficiently small to allow a majority of external light to pass through lens 201 unblocked. In the illustrated implementation, dynamic optical beam-steerer 220 is controllably rotatable about two orthogonal axes and therefore operable to redirect/scan light from its light source over the entire area of the user's eye. Dynamic optical beam-steerer 220 is electrically communicatively coupled (by at least one thin or substantially transparent electrically conductive pathway 221, e.g., adhered with glue or deposited as a thin film on a surface of lens 201) to and controlled by a controller 222 (e.g., variable current or power source) carried by support structure 250.

FIGS. 3A through 3K provide an illustrative example of how the wearable heads-up displays described herein can be used to display an image in the same field of view as light from external sources. FIGS. 3A through 3K implement transparent displays that are substantially similar to displays 100 and 200 from FIGS. 1 and 2, respectively.

Figure 3B:
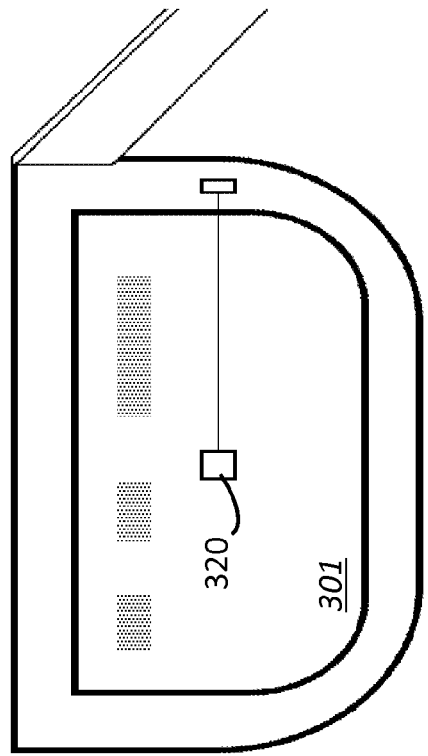
FIG. 3B is an illustrative diagram showing a front view of a wearable heads-up display in the first stage of the exemplary use in accordance with the present systems, devices, and methods.
Figure 3A:
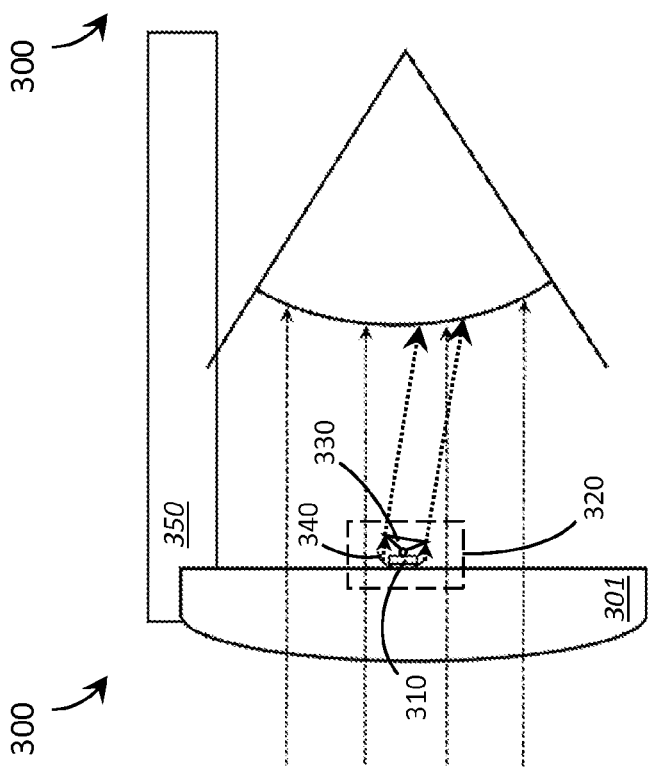
FIG. 3A is an illustrative diagram showing a side view of a wearable heads-up display in a first stage of an exemplary use in accordance with the present systems, devices, and methods.

FIGS. 3A and 3B are illustrative diagrams showing a side view and a front view, respectively, of a wearable heads-up display 300 in a first stage of an exemplary use in accordance with the present systems, devices, and methods. In the first stage of the exemplary use, a light source 310 component of a scanning projector 320, within the field of view of the user, is modulated to sequentially generate and emit a first set of light signals that together represent a first (i.e., topmost) row (e.g., row of pixels) of an image. The first set of light signals are substantially collimated by a collimator 340 component of the scanning projector 320 and received, also within the field of view of the user, by a dynamic optical beam-steerer 330 component of the scanning projector 320. Beam-steerer 330 redirects (e.g., reflects, refracts, diffracts, or some combination thereof) the first set of light signals towards select regions of the eye of the user. Since the first set of light signals correspond to the topmost row (e.g., row of pixels) of the image, beam-steerer 330 is positioned in a first rotational orientation in a first axis (e.g., a vertical or y-axis) and scans/rotates across a second axis (e.g., a horizontal or x-axis) to steer the light signals over a first region of the user's eye in the horizontal direction at a first angle in the vertical direction. Light from external sources passes through lens 301 to allow the user to see through the display 300 while light from light source 310 is directed into the user's field of view from beam-steerer 330.

Figure 3D:
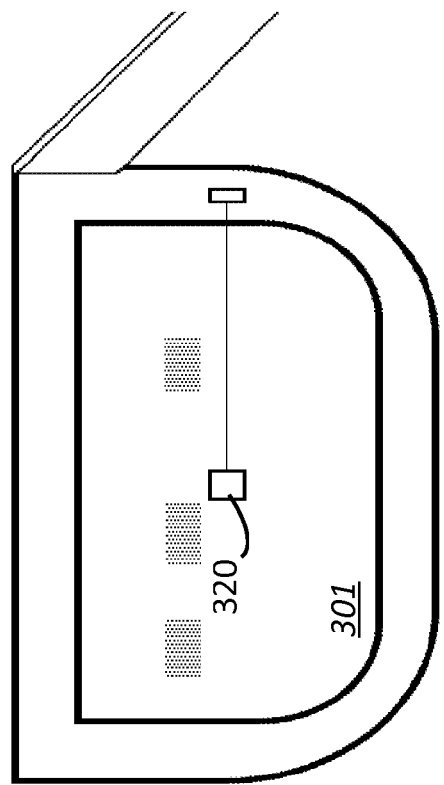
FIG. 3D is an illustrative diagram showing a front view of a wearable heads-up display in the second stage of the exemplary use in accordance with the present systems, devices, and methods.
Figure 3C:
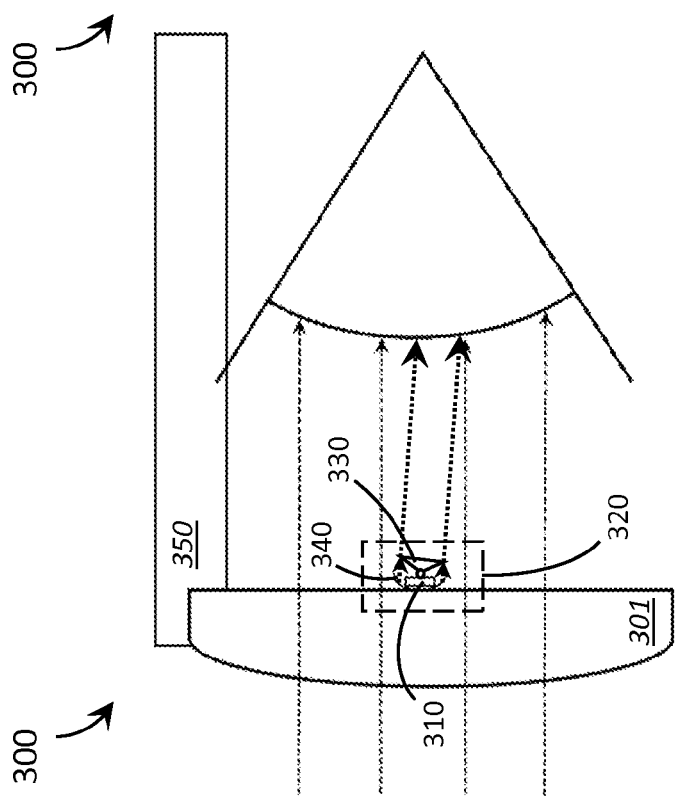
FIG. 3C is an illustrative diagram showing a side view of a wearable heads-up display in a second stage of the exemplary use in accordance with the present systems, devices, and methods.

FIGS. 3C and 3D are illustrative diagrams showing a side view and a front view, respectively, of display 300 in a second stage of the exemplary use in accordance with the present systems, devices, and methods. In the second stage of the exemplary use, light source 310 generates and emits, within the field of view of the eye of the user, a second set of light signals that together represent a second row (e.g., row of pixels) of an image. The second set of light signals are substantially collimated by collimators 340 and received by dynamic optical beam-steerer 330. Beam-steerer 330 redirects (e.g., reflects, refracts, diffracts, or some combination thereof), within the field of view of the eye of the user, the second set of light signals towards select regions of the eye of the user. Since the second set of light signals correspond to the second row (e.g., row of pixels) of the image, beam-steerer 330 is positioned in a second rotational orientation in the first axis (e.g., the vertical or y-axis) and scans/rotates across the second axis (e.g., the horizontal or x-axis) to steer the light signals over a second region of the user's eye in the horizontal direction at a second angle in the vertical direction. Light from external sources passes through lens 301 to allow the user to see through the display 300 while light from light source 310 is directed into the user's field of view from beam-steerer 330.

Figure 3F:
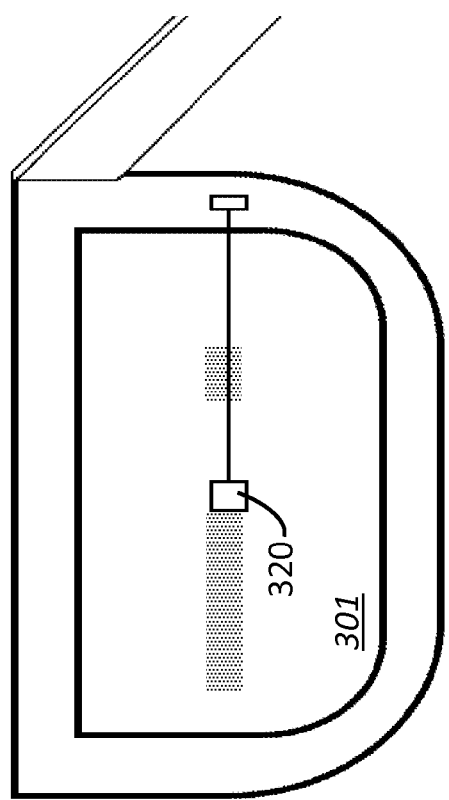
FIG. 3F is an illustrative diagram showing a front view of a wearable heads-up display in the third stage of the exemplary use in accordance with the present systems, devices, and methods.
Figure 3E:
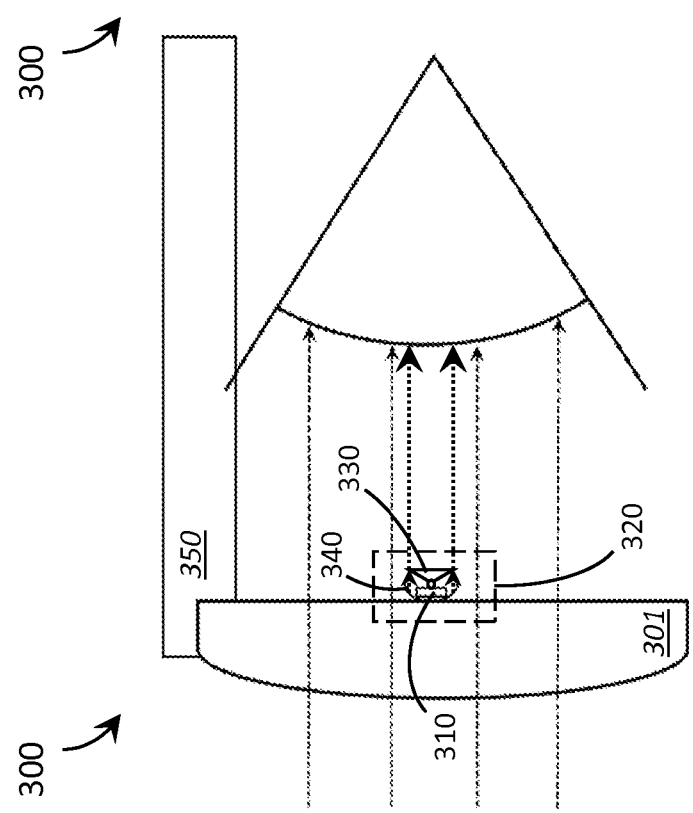
FIG. 3E is an illustrative diagram showing a side view of a wearable heads-up display in a third stage of the exemplary use in accordance with the present systems, devices, and methods.

FIGS. 3E and 3F are illustrative diagrams showing a side view and a front view, respectively, of display 300 in a third stage of the exemplary use in accordance with the present systems, devices, and methods. In the third stage of the exemplary use, light source 310 generates and emits, within the field of view of the eye of the user, a third set of light signals that together represent a third row (e.g., row of pixels) of an image. The third set of light signals are substantially collimated by collimators 340 and received by beam-steerer 330. Beam-steerer 330 redirects (e.g., reflects, refracts, diffracts, or some combination thereof), within the field of view of the eye of the user, the third set of light signals towards select regions of the eye of the user. Since the third set of light signals correspond to the third row (e.g., row of pixels) of the image, beam-steerer is positioned in a third rotational orientation in the first axis (e.g., the vertical or y-axis) and scans/rotates across the second axis (e.g., the horizontal or x-axis) to steer the light signals over a third region of the user's eye in the horizontal direction at a third angle in the vertical direction. Light from external sources passes through lens 301 to allow the user to see through the display 300 while light from light source 310 is directed into the user's field of view from beam-steerer 330.

FIGS. 3G and 3H are illustrative diagrams showing a side view and a front view, respectively, of display 300 in a fourth stage of the exemplary use in accordance with the present systems, devices, and methods. In the fourth stage of the exemplary use, light source 310 generates and emits, within the field of view of the eye of the user, a fourth set of light signals that together represent a fourth row (e.g., row of pixels) of an image. The fourth set of light signals are substantially collimated by collimators 340 and received by beam-steerer 330. Beam-steerer 330 redirects (e.g., reflects, refracts, diffracts, or some combination thereof), within the field of view of the eye of the user, the fourth set of light signals towards select regions of the eye of the user. Since the fourth set of light signals correspond to the fourth row (e.g., row of pixels) of the image, beam-steerer 330 is positioned in a fourth rotational orientation in the first axis (e.g., the vertical or y-axis) and scans/rotates across the second axis (e.g., the horizontal or x-axis) to steer the light signals over a fourth region of the user's eye in the horizontal direction at a fourth angle in the vertical direction. Light from external sources passes through lens 301 to allow the user to see through the display 300 while light from light source 310 is directed into the user's field of view from beam-steerer 330.

FIGS. 3I and 3J are illustrative diagrams showing a side view and a front view, respectively, of display 300 in a fifth stage of the exemplary use in accordance with the present systems, devices, and methods. In the fifth stage of the exemplary use, light source 310 generates and emits, within the field of view of the eye of the user, a fifth set of light signals that together represent a fifth row (e.g., row of pixels) of an image. The fifth set of light signals are substantially collimated by collimators 340 and received by beam-steerer 330. Beam-steerer 330 redirects (e.g., reflects, refracts, diffracts, or some combination thereof), within the field of view of the eye of the user, the fifth set of light signals towards select regions of the eye of the user. Since the fifth set of light signals correspond to the fifth row (e.g., row of pixels) of the image, beam-steerer 330 is positioned in a fifth rotational orientation in the first axis (e.g., the vertical or y-axis) and scans/rotates across the second axis (e.g., the horizontal or x-axis) to steer the light signals over a fifth region of the user's eye in the horizontal direction at a fifth angle in the vertical direction. Light from external sources passes through lens 301 to allow the user to see through the display 300 while light from light source 310 is directed into the user's field of view from beam-steerer 330.

Figure 3K:
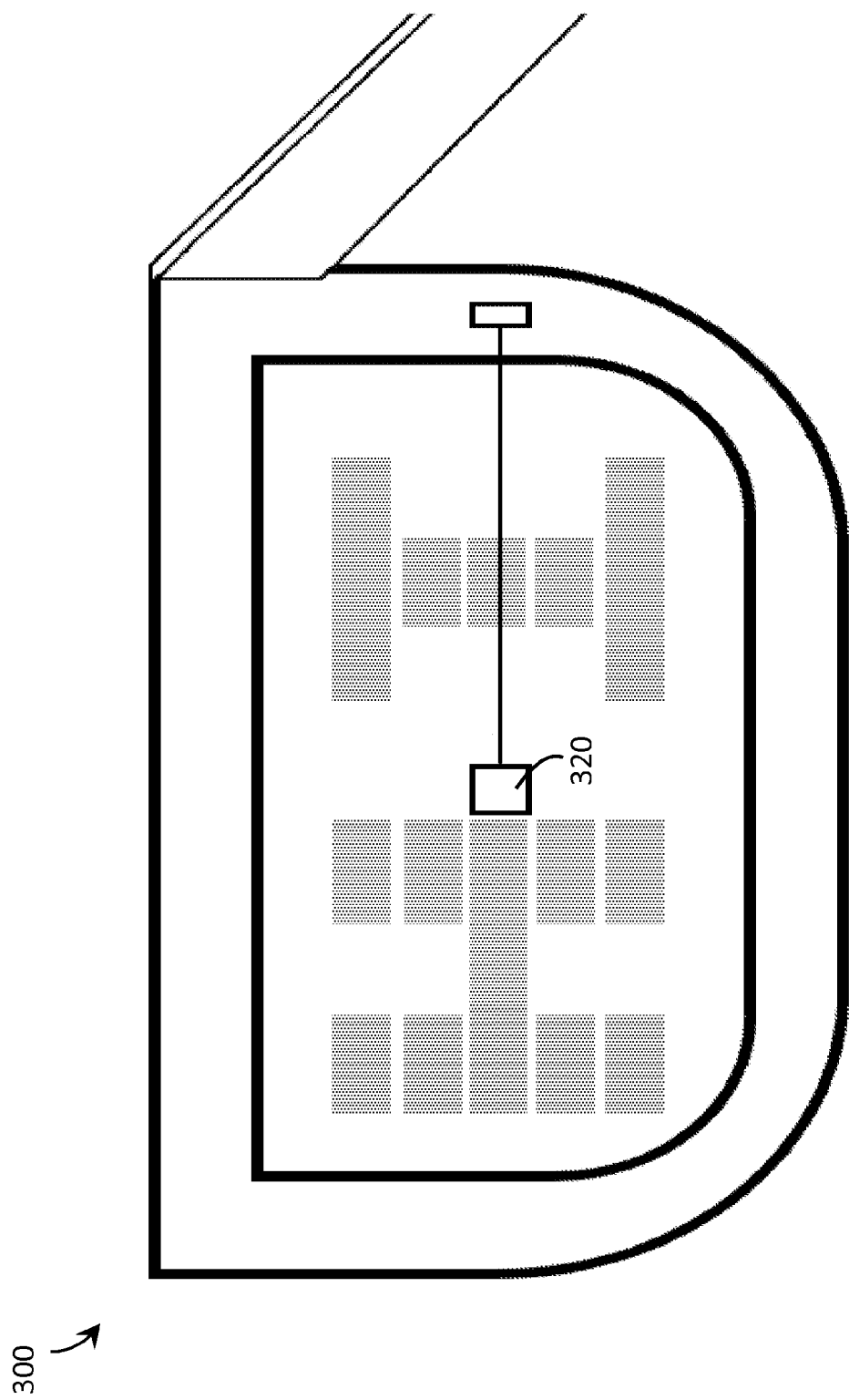
FIG. 3K is an illustrative diagram showing a front view of a wearable heads-up display and summarizing the cumulative effect of the exemplary use in accordance with the present systems, devices, and methods.

FIG. 3K is an illustrative diagram showing a front view (from the user's point of view) of display 300 and summarizing the cumulative effect of the exemplary use in accordance with the present systems, devices, and methods. In accordance with the present systems, devices, and apparatus, the light signals from light source 310 and the configuration of dynamic beam-steerer 330 (both respective components of scanning projector 320 and both positioned within the field of view of the eye of the user) may be substantially simultaneously switched, varied, cycled, modulated, or otherwise changed with sufficient rapidity (e.g., at a frequency on the order of hundreds of Hz, kHz, or even MHz) such that the user's eye does not detect the latency between receiving the light signals corresponding to the first row (e.g., row of pixels), as per FIGS. 3A and 3B, and receiving the light signals corresponding to the last row (e.g., last row of pixels), as per FIGS. 3I and 3J. The user sees a single cumulative image that projects upon, overlays, or otherwise shares the field of view with imagery from external sources and, in some implementations, may be tuned to exhibit varying degrees of transparency or opacity (e.g., by changing the frequency at which the elements are switched). FIG. 3K demonstrates that the cumulative effect of the successive portions of an image referenced in the exemplary use depicted in FIGS. 3A through 3J is an image of the word "HI" presented by display 300.

The wearable heads-up displays described herein may be used to display static or dynamic content (at virtually any resolution), including without limitation: text, images, notifications, maps, videos, menus, gauges, and/or dynamic user interfaces. As an example, 1080p video having a frame rate of 24 fps with a 16:9 aspect ratio may be presented by a display taught herein by synchronously modulating the light source (110, 210, 310) and the beam-steerer (130, 330) to project 1080 rows and 1920 columns at a switching at a rate of about 26 kHz (e.g., 1080 rows multiplied by 24 frames). Such is entirely feasible using, for example one or more laser diode(s) for the light source (110, 210, 310) and one or more microelectromechanical system (MEMS) based device(s) (e.g., digital micromirror) in the beam-steerer (130, 330).

While displays 100, 200, and 300 each implement a single scanning projector (120, 220, and 320, respectively) positioned in the user's field of view, alternative implementations may include multiple scanning projectors (120, 220, 320) positioned at multiple positions in the user's field of view on the lens (101, 201, 301, respectively), with each scanning projector communicatively coupled to a common or respective controller (e.g., 222) through a respective thin or substantially transparent electrically conductive pathway (e.g., 221). The use of multiple scanning projectors (120, 220, 320) can increase the field of view of the display (100, 200, 300) by using each scanning projector (120, 220, 320) to project a respective portion of a larger complete image, and/or the use of multiple scanning projectors (120, 220, 320) can increase the effective "eyebox" of the optical system by using each scanning projector (120, 220, 320) to project a respective copy of the same image. Increasing the effective eyebox enables the user to see the projected image from a wider range of eye positions; however, since scanning projectors (120, 220, 320) positioned in the user's field of view may block the transmission of light from external sources, it can be advantageous to use a small number of scanning projectors (120, 220, 320), such as 1, 2, 5 or fewer, between 5 and 10, or fewer than 20. In some implementations, a square grid of scanning projectors (120, 220, 320) may be used, such as 4 scanning projectors, 9 scanning projectors, 16 scanning projectors, and so on.

Figure 4:
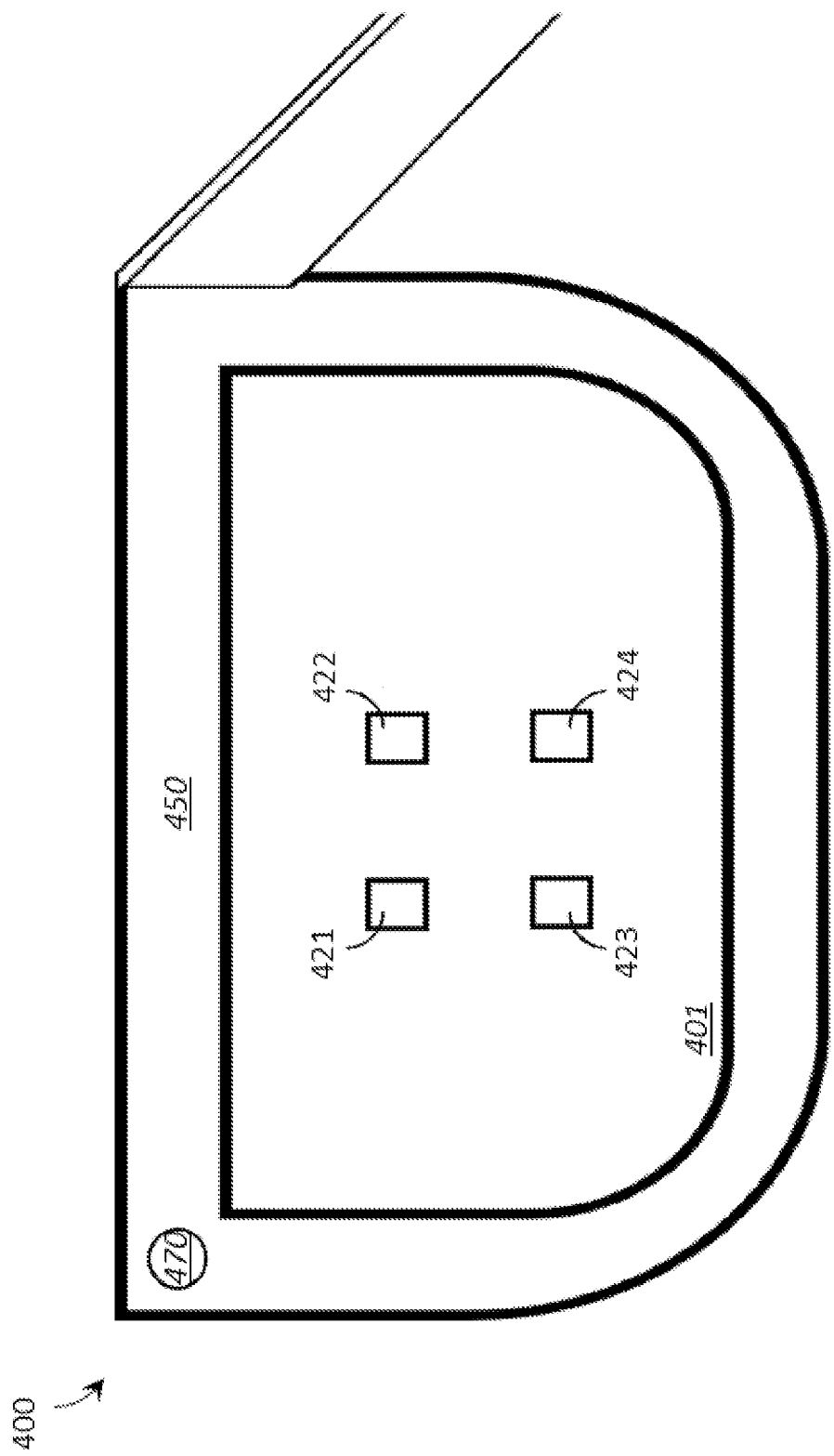
FIG. 4 is an illustrative diagram showing a front view (from the user's point of view) of a wearable heads-up display employing multiple lens-mounted scanning projectors in accordance with the present systems, devices, and methods.

FIG. 4 is an illustrative diagram showing a front view (from the user's point of view) of a wearable heads-up display 400 employing multiple lens-mounted scanning projectors 421, 422, 423, and 424 in accordance with the present systems, devices, and methods. Display 400 is substantially similar to displays 100, 200, and 300 in that it includes a transparent element (or lens) 401 carried by a support structure 450 and positioned in the field of view of an eye of a user when the support structure 450 is worn on the head of the user. Like displays 100, 200, and 300, support structure 450 includes an arm 451 that extends towards the user's ear; however, display 400 differs from displays 100, 200, and 300 in that display 400 includes multiple (e.g., four in the illustrated embodiment) scanning projectors 421, 422, 424, and 424 all positioned on or proximate lens 401 in the field of view of the eye of the user, the four scanning projectors 421, 422, 423, and 424 all being physically spaced apart from one another. Depending on the specific implementation, any one or combination of scanning projectors may be active/inactive at any given time. That is, each of scanning projectors 421, 422, 423, and 424 may be selectively activatable/deactivatable.

The various embodiments described herein may also include systems and methods for eye tracking. As an example, display 400 includes an eye-tracker 470 (only a single component drawn, though a person of skill in the art will appreciate that an eye-tracker may include multiple components, such as for example an infrared light source and an infrared light detector). In use, eye-tracker 470 determines the position of the user's eye and/or the user's gaze direction relative to lens 401 and, in particular, relative to scanning projectors 421, 422, 423, and 424. With this information, display 400 may selectively control which of scanning projectors 421, 422, 423, and/or 424 is/are used to steer light signals into the user's eye. For example, if one or more of scanning projectors 421, 422, 423, and/or 424 is/are not capable of steering light signals into the region of the user's pupil given the user's pupil position as determined by eye-tracker 470, then that one or more dynamic reflector 421, 422, 423, and/or 424 may be deactivated until the user moves their pupil to a new position. In other words, each of scanning projectors 421, 422, 423, and 424 may be selectively activatable/deactivatable based, at least in part, on a position of the at least one eye of the user as determined by eye-tracker 470.

The transparent displays described herein may be used in applications outside of the space of wearable heads-up displays (e.g., as televisions, monitors, and the like) or in more specialized applications such as window display screens. In applications where a transparent display is typically viewed from a distance (e.g., on the order of meters) the collimators described may not be necessary. However, with the use of collimators, the transparent displays described herein are particularly well-suited for use in wearable heads-up display devices. In such devices, a single transparent display may be positioned in the field of view of one eye of the user while no transparent display is positioned in the field of view of the other eye of the user, or a single transparent display may be positioned in (and span) the fields of views of both eyes of the user, or a first transparent display (e.g., 100, 200, 300) may be positioned in the field of view of a first eye of the user and a second transparent display (e.g., 100, 200, 300) may be positioned in the field of view of a second eye of the user. In the latter case, the second transparent display may essentially duplicate the first transparent display, with or without stereoscopic adjustment as desired.

Figure 5:
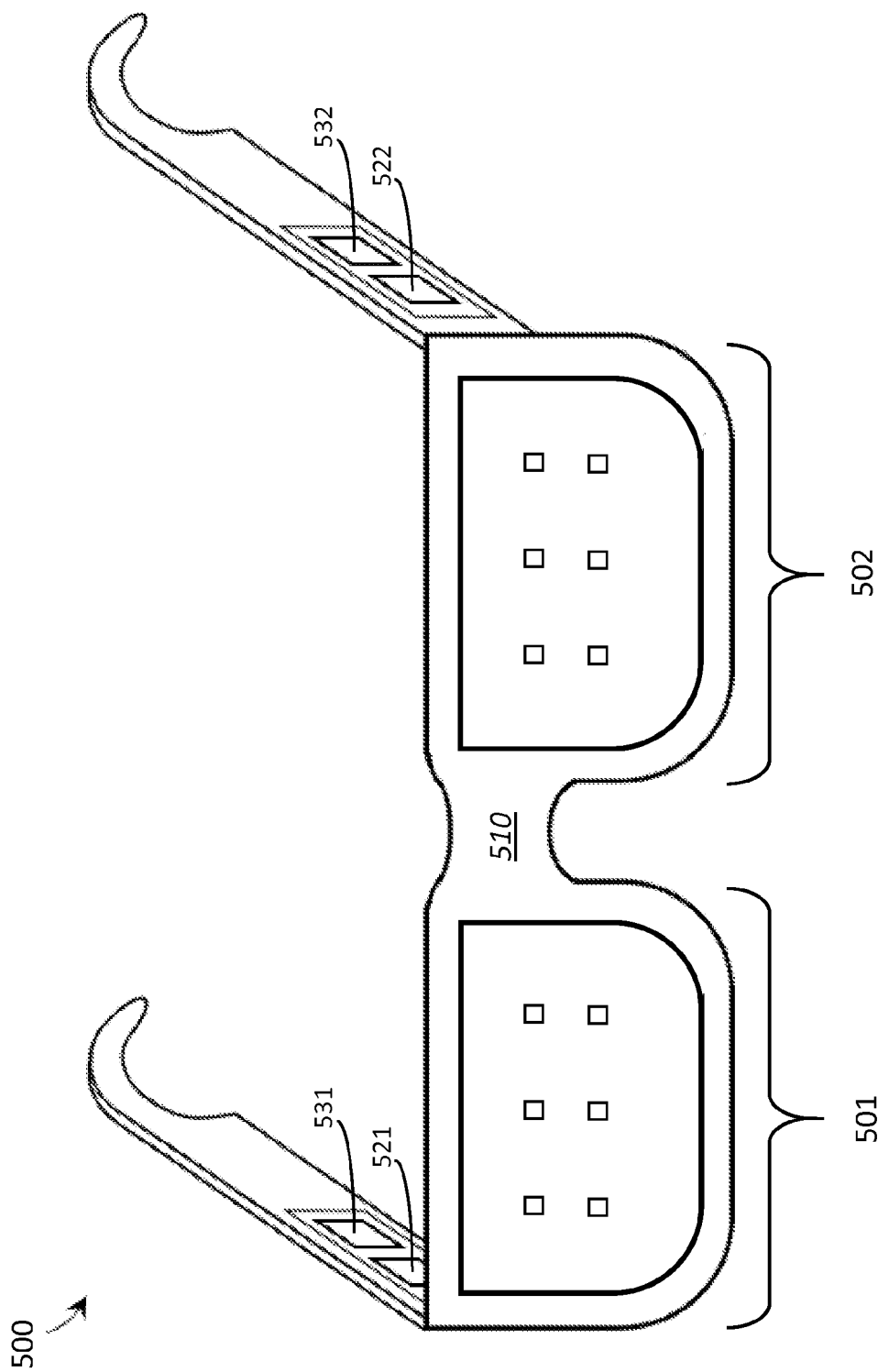
FIG. 5 is a perspective view of an exemplary wearable heads-up display employing two transparent display elements in accordance with the present systems, devices, and methods.

FIG. 5 is a perspective view of an exemplary wearable heads-up display 500 employing two transparent displays 501, 502 in accordance with an implementation of the present systems, devices, and methods. Each of displays 501, 502 may be substantially similar to any of displays 100, 200, 300, and/or 400 described previously. Wearable heads-up display 500 includes a support structure 510 having the general shape and appearance of a set of eyeglasses or sunglasses and that, in use, is worn on a head of a user so that first display 501 is positioned within a field of view of a first eye of the user and second display 502 is positioned within a field of view of a second eye of the user. First and second sets of scanning projectors (not called out in FIG. 5 to reduce clutter) are positioned on or proximate displays 501 and 502, respectively, and, when support structure 510 is worn on the head of a user, within the field of view with the first and second eye of the user, respectively.

In order to control the content displayed on first transparent display 501, wearable heads-up display 500 includes a first processor 521 physically coupled to support structure 510 and communicatively coupled to the first set of scanning projectors of first display 501; and a first non-transitory processor-readable storage medium 531 physically coupled to support structure 510 and communicatively coupled to first processor 521. First non-transitory processor-readable storage medium 531 stores processor-executable instructions that, when executed by first processor 521, cause first processor 521 to: control the light provided by the light sources and control the angle/position/orientation of each beam steerer in the first set of scanning projectors of display 501. In some implementations, a single processor and a single non-transitory processor-readable storage medium may control the operations of both first display 501 and second display 502; however, in the illustrated example of FIG. 5, wearable heads-up display 500 includes a second processor 522 and a second non-transitory processor-readable storage medium 532 communicatively coupled thereto for controlling the scanning projectors of second display 502.

In some applications of wearable heads-up displays 500 that employ two transparent displays 501 and 502, both transparent displays 501 and 502 may simultaneously display visual content to the user. However, in other applications, it may be advantageous to rapidly alternate which of the two displays 501 and 502 is displaying content to the user while the other of displays 502 and 501 is in a state of maximal transparency. For example, in an application in which video is displayed to a user, all odd frames may be displayed on first display 501 while second display 502 is in a state of maximal transparency and all even frames may be displayed on second display 502 while first display 501 is in a state of maximal transparency. This approach can maximize the user's perception of light from external sources without noticeably detracting from the quality of the content displayed on displays 501 and 502. Similar techniques are employed in, for example, shutter-based 3D glasses.

In some applications of a wearable heads-up display, it may be advantageous for displayed content to be projected towards to a specific and limited region of the user's eye such that the displayed content may go in and out of the user's field of view depending on where the user is looking (i.e., the user will see the displayed content only if the user moves his/her pupil into the region where the displayed content is projected). For example, if all of the light signals generated by the wearable heads-up display are generally directed towards the top of the user's eye, then the user may only see the displayed content when the user glances upwards. Conversely, in other applications it may be advantageous for displayed content to remain visible to the user over a wide range of eye positions. In other words, it may be advantageous for the user to be able to see the displayed content regardless of where the user is looking (or, at least, when the user is looking in any of multiple different directions). The range of eye positions over which specific content is visible to the user is generally referred to as the "eyebox." An application in which displayed content is only visible from a single or small range of eye positions has a "small eyebox," and an application in which displayed content is visible form a wide range of eye positions has a "large eyebox."

Figure 6:
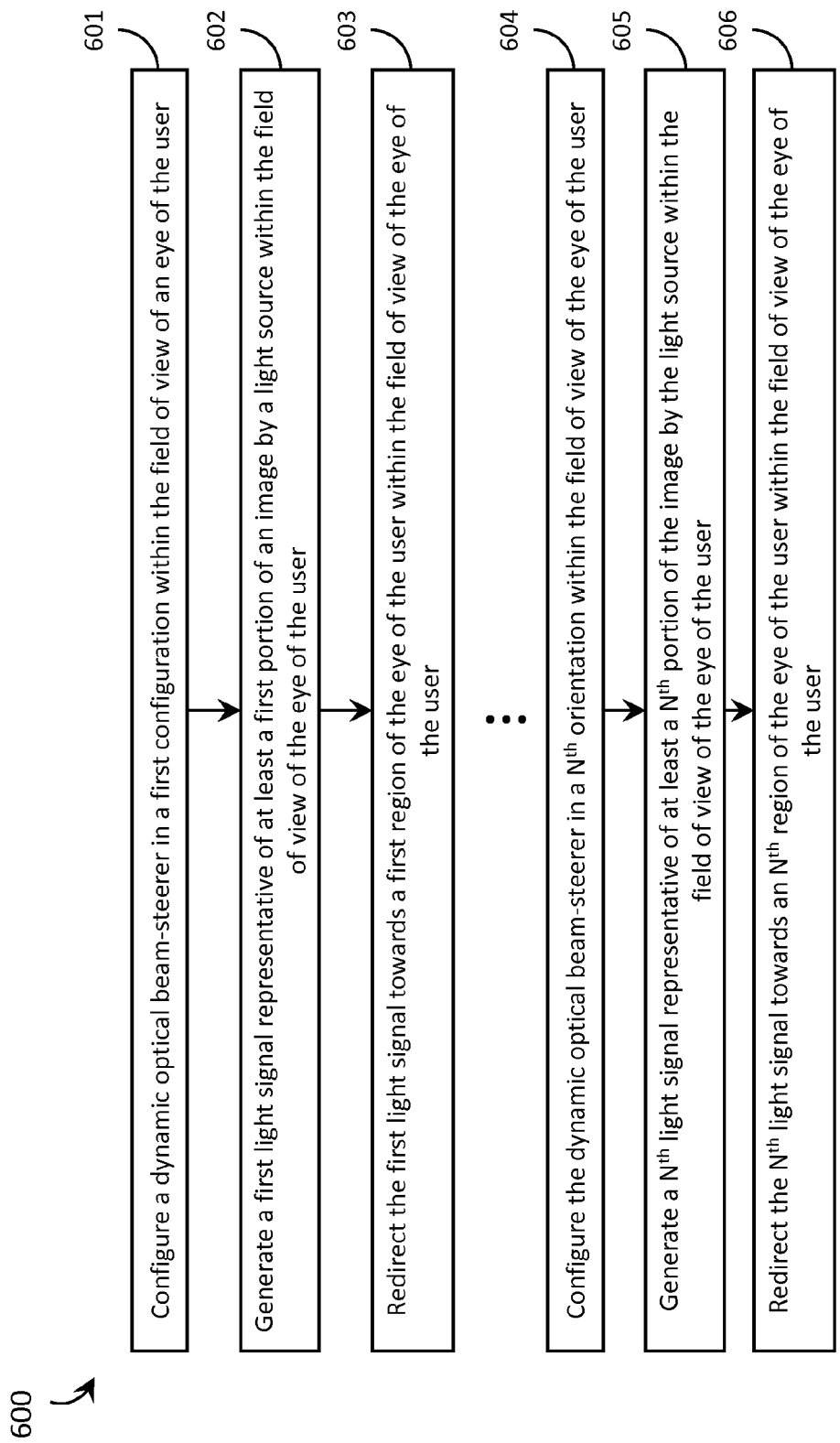
FIG. 6 is a flow-diagram showing a method of operating at least one transparent display element of a wearable heads-up display when the wearable heads-up display is worn on a head of a user in accordance with the present systems, devices, and methods.

FIG. 6 is a flow-diagram showing a method 600 of operating at least one transparent display of a wearable heads-up display when the wearable heads-up display is worn on a head of a user in accordance with the present systems, devices, and methods. Method 600 includes six acts 601, 602, 603, 604, 605, and 606, though those of skill in the art will appreciate that in alternative embodiments certain acts may be omitted and/or additional acts may be added. In particular, as described in more details below, one or more repetitions of acts 601, 602, and 603 may be included in between act 603 and 604 for one or more additional light signals representative of one or more additional portion(s) of an image. Those of skill in the art will also appreciate that the illustrated order of the acts is shown for exemplary purposes only and may change in alternative embodiments. For the purpose of method 600, the term "user" refers to a person that is wearing the wearable heads-up display (e.g., 500).

At 601, a dynamic optical beam-steerer (e.g., 130, 330) of the display is configured in a first configuration (e.g., in a first rotational orientation) within the field of view of an eye of the user. The beam-steerer may include, for example, a MEMS-based component and the configuration of the dynamic beam-steerer may be controlled by, for example, a processor on-board the wearable heads-up display in response to the processor executing processor-executable instructions stored in a non-transitory processor-readable medium also located on-board the wearable heads-up display. The configuration of the beam-steerer may be controllable in a single or multiple dimensions.

At 602, a light source (e.g., 110, 210, 310, or 410) generates and emits, within the field of view of the eye of the user, a first light signal representative of at least a first portion of an image. The light source may include one or more LED(s) and/or OLED(s) of any number of colors, and/or one or more laser device(s)/module(s). The light source and the dynamic optical beam-steerer may be integrated together in a single package as a scanning projector. The first portion of the image may include a first pixel of the image, or a modulated pattern corresponding to the pixels of a first row of an image.

At 603, the dynamic optical beam-steerer redirects the first light signal towards a first region of the eye of the user within the field of view of the eye of the user. The placement of the corresponding image in the user's field of view depends on the configuration of the dynamic beam-steerer established at 601.

Acts 601, 602, and 603 may be repeated sequentially for multiple light signals respectively corresponding to multiple portions of an image. For example, acts 601, 602, and 603 may be repeated for a second light signal corresponding to a second portion of the image using a second configuration of the dynamic beam-steerer. When the image includes N portions, where N is an integer greater than 2, method 600 may include, until i=(N+1), where i is an integer with an initial value of 3, sequentially: configuring the dynamic beam-steerer in an $i^{th}$ configuration within the field of view of the eye of the user; generating an $i^{th}$ light signal representative of an $i^{th}$ portion of the image by the light source within the field of view of the eye of the user; redirecting the $i^{th}$ light signal towards an $i^{th}$ region of the eye of the user by the dynamic beam-steerer within the field of view of the user; and incrementing i by 1.

In general, method 600 may include sequentially repeating acts 601, 602, and 603 for successive portions of the image until the $N^{th}$ or final portion of the image is reached. Once the $N^{th}$ or final portion of the image is reached, method 600 may proceed to act 604.

At 604, the dynamic optical beam-steerer is configured in a $N^{th}$ configuration within the field of view of the eye of the user similar to act 601.

At 605, the light source generates and emits an $N^{th}$ light signal representative of at least a $N^{th}$ portion of the image within the field of view of the eye of the user similar to act 602.

At 606, the dynamic beam-steerer redirects the $N^{th}$ light signal towards an $N^{th}$ region of the eye of the user within the field of view of the eye of the user similar to act 603.

As previously described, a user may be better able to focus on images displayed on the transparent displays described herein when employed in wearable heads-up displays if the light signals corresponding to the images are directed in substantially parallel beams. To this end, method 600 may include collimating the light signals by at least one collimator and/or the light-redirection element may be engineered to produce/output substantially collimated light when the light is redirected.

The wearable heads-up display may include a processor and a non-transitory processor-readable storage medium communicatively coupled to the processor that together control at least some of the acts of method 600. For example, method 600 may further include executing, by the processor on-board the wearable heads-up display, processor-executable instructions stored in the non-transitory processor-readable medium to: cause the processor to instruct the at least one light source to generate and emit the light signal representative of at least a portion of the image per act 602/605; and cause the processor to instruct the dynamic beam-steerer to adopt the configuration per act 601/604.

As described previously and depicted in FIG. 4, the wearable heads-up displays of the present systems, devices, and methods may employ multiple scanning projectors, each mounted and spatially separated on or proximate the lens and in the field of view of the user when the user wears the heads-up display. Accordingly, the "dynamic beam steerer" referred to in method 600 may be interpreted as a "first dynamic beam steerer," and if the wearable heads-up display includes at least a second scanning projectors then method 600 may be extended to include: i) configuring the second dynamic optical beam-steerer of the second scanning projector in a first configuration within the field of view of the eye of the user; ii) generating a light signal representative of at least a portion of an image by the second light source of the second scanning projector within the field of view of the eye of the user; and iii) redirecting the light signal towards a region of the eye of the user by the second dynamic optical beam-steerer of the second scanning projector within the field of view of the eye of the user.

As also depicted in FIG. 4, the wearable heads-up display may include an eye-tracker. In the case of a display that includes an eye-tracker, a first scanning projector, and at least a second scanning projector, method 600 may be extended to include: determining a position of the eye of the user by the eye-tracker; and selectively activating/deactivating the first scanning projector and/or the second scanning projector based, at least in part, on the position of the eye of the user determined by the eye-tracker.

Each implementation of a wearable heads-up display described herein may be summarized as including a transparent near-eye display that can be integrated into a wearable display with the form factor of a regular pair of glasses.

Throughout this specification and the appended claims, reference is often made to "rotating" beam-steerers and beam-steerers being "oriented" at a particular "angle" or "configuration." A person of skill in the art (e.g., in the art of micromirrors such as digital MEMS-based micromirrors) will appreciate that the concept of "rotation" is used herein as a generalization and that a similar effect may be achieved by a bending or deformation of a micromirror surface.

In some implementations, one or more optical fiber(s) may be used to guide light signals along some of the paths illustrated herein. For example, light may travel from a light source to a first point of redirection (e.g., to a light-redirection element) through one or more optical fiber cable(s).

The wearable heads-up displays described herein may include one or more sensor(s) (e.g., microphone, camera, thermometer, compass, and/or others) for collecting data from the user's environment. For example, one or more camera(s) may be used to provide feedback to the processor of the wearable heads-up display and influence where on the transparent display(s) any given image should be displayed.

The wearable heads-up displays described herein may include one or more on-board power sources (e.g., one or more battery(ies)), a wireless transceiver for sending/receiving wireless communications, and/or a tethered connector port for coupling to a computer and/or charging the one or more on-board power source(s).

The wearable heads-up displays described herein may receive and respond to commands from the user in one or more of a variety of ways, including without limitation: voice commands through a microphone; touch commands through buttons, switches, or a touch sensitive surface; and/or gesture-based commands through gesture detection systems.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, U.S. Provisional Patent Application Ser. No. 62/017,089 and U.S. Provisional Patent Application Ser. No. 62/053,598 are incorporated herein by reference, in their entirety. Aspects of the embodiments can be modified, if necessary, to employ systems, circuits and concepts of U.S. Provisional Patent Application Ser. No. 62/017,089 and/or U.S. Provisional Patent Application Ser. No. 62/053,598 to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable heads-up display comprising:
   a support structure that in use is worn on a head of a user;
   a transparent element that is physically coupled to the support structure, wherein the transparent element is positioned within a field of view of an eye of the user when the support structure is worn on the head of the user; and
   a scanning projector positioned on a transparent surface of the transparent element in the field of view of the eye of the user, the scanning projector comprising:
   a light source to sequentially generate light signals representative of portions of an image; and
   a dynamic optical beam-steerer positioned to receive light signals provided by the light source and to controllably scan the light signals over the eye of the user to produce a collective image at the eye of the user, the dynamic optical beam-steerer controllably variable in at least one parameter with respect to the light signals, wherein a direction or path of the light signals is controllably affected by the at least one parameter.

2. The wearable heads-up display of claim 1, further comprising a collimator to collimate light signals provided by the light source.

3. The wearable heads-up display of claim 2 wherein the collimator includes a parabolic reflector positioned in between the light source and the dynamic optical beam-steerer with respect to a path of light signals provided by the light source, and wherein the light source is oriented to direct light signals away from the eye of the user and the parabolic reflector is oriented to reflect the light signals from the light source towards the eye of the user.

4. The wearable heads-up display of claim 1 wherein the light source includes at least one light source selected from the group consisting of: a light-emitting diode and a laser.

5. The wearable heads-up display of claim 1 wherein the dynamic optical beam-steerer is controllably rotatable about at least two axes.

6. The wearable heads-up display of claim 1 wherein the dynamic optical beam-steerer is transmissive of the light signals provided by the light source.

7. The wearable heads-up display of claim 1 wherein the dynamic optical beam-steerer controllably scans the light signals over the eye of the user by at least one of reflection, refraction, and/or diffraction.

8. The wearable heads-up display of claim 1 wherein the transparent element includes a prescription eyeglass lens.

9. The wearable heads-up display of claim 1 wherein the transparent element is positioned within a field of view of a first eye of the user when the support structure is worn on the head of the user, and further comprising:
   a second transparent element that is physically coupled to the support structure, wherein the second transparent element is positioned within a field of view of a second eye of the user when the support structure is worn on the head of the user; and
   a second scanning projector positioned on a transparent surface of the second transparent element in the field of view of the second eye of the user, the second scanning projector comprising:
   a second light source to sequentially generate light signals representative of portions of an image; and
   a second dynamic optical beam-steerer positioned to receive light signals provided by the second light source and controllably scan the light signals over the second eye of the user to produce an image at the second eye of the user, the second dynamic optical beam-steerer controllably variable in at least one parameter with respect to the light signals, wherein a direction or path of the light signals is controllably affected by the at least one parameter.

10. The wearable heads-up display of claim 1 wherein the support structure has a general shape and appearance of an eyeglasses frame.

11. The wearable heads-up display of claim 1, further comprising:
    a processor physically coupled to the support structure and communicatively coupled to the scanning projector; and
    a non-transitory processor-readable storage medium physically coupled to the support structure and communicatively coupled to the processor, wherein the non-transitory processor-readable storage medium stores processor-executable instructions that, when executed by the processor, cause the processor to:
    control the light signals provided by the light source of the scanning projector; and
    control the dynamic optical beam-steerer of the scanning projector to scan the light signals provided by the light source over the eye of the user.

12. The wearable heads-up display of claim 1 wherein the scanning projector includes a first scanning projector, and further comprising:
    a second scanning projector positioned on or proximate the transparent element in the field of view of the eye of the user when the support structure is worn on the head of the user, the second scanning projector physically spaced apart from the first scanning projector, wherein the second scanning projector comprises:
    a second light source to sequentially generate light signals representative of portions of an image; and
    a second dynamic optical beam-steerer positioned to receive light signals provided by the second light source and controllably scan the light signals over the eye of the user, the second dynamic optical beam-steerer controllably variable in at least one parameter with respect to the light signals, wherein a direction or path of the light signals is controllably affected by the at least one parameter.

13. The wearable heads-up display of claim 9, further comprising:
at least one additional scanning projector positioned on or proximate the transparent element in the field of view of the eye of the user when the support structure is worn on the head of the user, the at least one additional scanning projector physically spaced apart from the first scanning projector and the second scanning projector, wherein the at least one additional scanning projector comprises:
at least one additional light source to sequentially generate light signals representative of portions of an image; and
at least one additional dynamic optical beam-steerer positioned to receive light signals provided by the at least one additional light source and controllably scan the light signals over the eye of the user, the at least one additional dynamic optical beam-steerer controllably variable in at least one parameter with respect to the light signals, wherein a direction or path of the light signals is controllably affected by the at least one parameter.

14. The wearable heads-up display of claim 12, further comprising an eye-tracker carried by the support structure, wherein both the first scanning projector and the second scanning projector are selectively activatable/deactivatable based, at least in part, on a position of the eye of the user as determined by the eye-tracker.

15. A method of operating a wearable heads-up display when the wearable heads-up display is worn on a head of a user, the wearable heads-up display including a transparent element positioned in a field of view of an eye of the user and a scanning projector positioned in the field of view of the eye of the user on a transparent surface of the transparent element, the scanning projector comprising a light source and a dynamic optical beam-steerer and the method comprising:
configuring the dynamic optical beam-steerer of the scanning projector in a first configuration within the field of view of the eye of the user;
generating a first light signal representative of a first portion of an image by the light source of the scanning projector within the field of view of the eye of the user; and
redirecting the first light signal directly towards a first region of the eye of the user by the dynamic optical beam-steerer of the scanning projector within the field of view of the eye of the user.

16. The method of claim 15, further comprising:
configuring the dynamic optical beam-steerer of the scanning projector in a second configuration within the field of view of the eye of the user;
generating a second light signal representative of at least a second portion of the image by the light source of the scanning projector within the field of view of the eye of the user; and
redirecting the second light signal directly towards a second region of the eye of the user by the dynamic optical beam-steerer of the scanning projector within the field of view of the eye of the user.

17. The method of claim 16 wherein the image includes N portions, where N is an integer greater than 2, the method further comprising:
until i=(N+1), where i is an integer with an initial value of 3, sequentially:
configuring the dynamic optical beam-steerer of the scanning projector in an $i^{th}$ configuration within the field of view of the eye of the user;
generating an $i^{th}$ light signal representative of at least an $i^{th}$ portion of the image by the light source of the scanning projector within the field of view of the eye of the user; and
redirecting the $i^{th}$ light signal directly towards an $i^{th}$ region of the eye of the user by the dynamic optical beam-steerer of the scanning projector within the field of view of the eye of the user; and
incrementing i by 1.

18. The method of claim 15 wherein the wearable heads-up display includes a processor communicatively coupled to the light source and to the dynamic optical beam-steerer, and a non-transitory processor-readable storage medium communicatively coupled to the processor, the non-transitory processor-readable storage medium storing processor-executable instructions, and wherein the method further comprises executing the processor-executable instructions by the processor to:
cause the processor to instruct the light source of the scanning projector to generate the first light signal representative of at least a first portion of the image within the field of view of the eye of the user; and
cause the processor to instruct the dynamic optical beam-steerer to adopt the first configuration within the field of view of the eye of the user.

19. The method of claim 15 wherein the wearable heads-up display further includes a second scanning projector positioned on or proximate the transparent element and within the field of view of the eye of the user, the second scanning projector physically spaced apart from the first scanning projector and the second scanning projector comprising a second light source and a second dynamic optical beam-steerer, and wherein the method further comprises:
configuring the second dynamic optical beam-steerer of the second scanning projector in a first configuration within the field of view of the eye of the user;
generating a light signal representative of at least a portion of an image by the second light source of the second scanning projector within the field of view of the eye of the user; and
redirecting the light signal directly towards a region of the eye of the user by the second dynamic optical beam-steerer of the second scanning projector within the field of view of the eye of the user.

20. The method of claim 19 wherein the wearable heads-up display further includes an eye-tracker, the method further comprising:
determining a position of the eye of the user by the eye-tracker; and
selectively activating/deactivating the first scanning projector and/or the second scanning projector based, at least in part, on the position of the eye of the user determined by the eye-tracker.

* * * * *